(12) United States Patent
Somasundaran et al.

(10) Patent No.: US 10,885,274 B1
(45) Date of Patent: Jan. 5, 2021

(54) PLATFORM FOR ADMINISTERING AND EVALUATING NARRATIVE ESSAY EXAMINATIONS

(71) Applicant: Educational Testing Service, Princeton, NJ (US)

(72) Inventors: Swapna Somasundaran, Plainsboro, NJ (US); Michael Flor, Lawrenceville, NJ (US); Martin Chodorow, New York, NY (US); Binod Gyawali, Lawrenceville, NJ (US); Hillary Molloy, San Francisco, CA (US); Laura McCulla, Macomb, MI (US)

(73) Assignee: Educational Testing Service, Princeton, NJ (US)

( * ) Notice: Subject to any disclaimer, the term of this patent is extended or adjusted under 35 U.S.C. 154(b) by 244 days.

(21) Appl. No.: 16/014,021

(22) Filed: Jun. 21, 2018

Related U.S. Application Data

(60) Provisional application No. 62/523,338, filed on Jun. 22, 2017.

(51) Int. Cl.
   *G06F 40/279* (2020.01)
   *G06F 16/34* (2019.01)
   (Continued)

(52) U.S. Cl.
   CPC .......... *G06F 40/279* (2020.01); *G06F 16/313* (2019.01); *G06F 16/34* (2019.01); *G06F 40/30* (2020.01)

(58) Field of Classification Search
   CPC ...... G06F 40/30; G06F 40/289; G06F 40/253; G06F 40/205; G06F 40/20; G06F 40/279;
   (Continued)

(56) References Cited

U.S. PATENT DOCUMENTS

| | | | |
|---|---|---|---|
| 2004/0126749 A1* | 7/2004 | Honma | G09B 7/00 434/362 |
| 2005/0143971 A1* | 6/2005 | Burstein | G06F 40/253 704/4 |

(Continued)

OTHER PUBLICATIONS

Agarwal, Apoorv, Kotalwar, Anup, Rambow, Owen; Automatic Extraction of Social Networks from Literary Text: A Case Study on Alice in Wonderland; International Joint Conference on Natural Language Processing; Nagoya, Japan; pp. 1202-1208; Oct. 2013.

(Continued)

*Primary Examiner* — Richemond Dorvil
*Assistant Examiner* — Rodrigo A Chavez
(74) *Attorney, Agent, or Firm* — Jones Day

(57) ABSTRACT

Systems and methods are provided for processing a response to essay prompts that request a narrative response. A data structure associated with a narrative essay is accessed. The essay is analyzed to generate an organization subscore, where the organization subscore is generated using a graph metric by identifying content words in each sentence of the essay and populating a data structure with links between related content words in neighboring sentences, wherein the organization subscore is determined based on the links. The essay is analyzed to generate a development subscore, where the development subscore is generated using a transition metric by accessing a transition cue data store and identifying transition words in the essay, wherein the development subscore is based on a number of words in the essay that match words in the transition cue data store. A narrative quality metric is determined based on the organization subscore and the development subscore.

20 Claims, 10 Drawing Sheets

(51) Int. Cl.
 *G06F 16/31* (2019.01)
 *G06F 40/30* (2020.01)
(58) Field of Classification Search
 CPC ........ G06F 40/10; G06F 16/36; G06F 16/313; G06F 16/34
 USPC .......................................................... 704/9
 See application file for complete search history.

(56) References Cited

U.S. PATENT DOCUMENTS

| | | | | |
|---|---|---|---|---|
| 2006/0100852 | A1* | 5/2006 | Gamon | G06F 40/30 704/9 |
| 2008/0026360 | A1* | 1/2008 | Hull | G09B 7/00 434/324 |
| 2009/0226872 | A1* | 9/2009 | Gunther | G09B 7/00 434/350 |
| 2010/0275179 | A1* | 10/2010 | Mengusoglu | G06F 40/205 717/104 |
| 2012/0088219 | A1* | 4/2012 | Briscoe | G06N 20/00 434/362 |
| 2015/0199913 | A1* | 7/2015 | Mayfield | G09B 7/02 434/353 |
| 2018/0025743 | A1* | 1/2018 | Childress | G10L 25/63 704/205 |
| 2019/0088155 | A1* | 3/2019 | Liu | G09B 7/06 |

OTHER PUBLICATIONS

Alm, Cecilia Ovesdotter, Sproat, Richard; Emotional Sequencing and Development in Fairy Tales; International Conference on Affective Computing and Intelligent Interaction; pp. 668-674; 2005.
Almeida, Michael; Time in Narratives; Ch. 7 in Deixis in Narrative: A Cognitive Science Perspective, J. Duchan et al. Eds.; Lawrence Erlbaum Associates: Hillsdale, NJ; pp. 159-189; 1995.
Amabile, Teresa; Social Psychology of Creativity: A Consensual Assessment Technique; Journal of Personality and Social Psychology, 43(5); pp. 997-1013; 1982.
Attali, Yigal, Burstein, Jill; Automated Essay Scoring With E-rater, v.2; Journal of Technology, Learning, and Assessment, 4(3); Feb. 2006.
Bacha, Nahla; Writing Evaluation: What Can Analytic Versus Holistic Essay Scoring Tell Us?; System, 29(3); pp. 371-383; Sep. 2001.
Balasubramanian, Niranjan, Soderland, Stephen, Mausam, Etzioni, Oren; Generating Coherent Event Schemas at Scale; Proceedings of the 2013 Conference on Empirical Methods in Natural Language Processing (EMNLP 2013); Seattle, WA; pp. 1721-1731; Oct. 2013.
Bamman, David, Underwood, Ted, Smith, Noah; A Bayesian Mixed Effects Model of Literary Character; Proceedings of the 52nd Annual Meeting of the Association for Computational Linguistics; Baltimore, MD; pp. 370-379; Jun. 2014.
Beigman Klebanov, Beata, Burstein, Jill, Madnani, Nitin, Faulkner, Adam, Tetreault, Joel; Building Subjectivity Lexicon(s) from Scratch for Essay Data; Proceedings of the 13th International Conference on Intelligent Text Processing and Computational Linguistics; New Delhi, India; 2012.
Berg-Kirkpatrick, Taylor, Burkett, David, Klein, Dan; An Empirical Investigation of Statisical Significance in NLP; Proceedings of the 2012 Joint Conference on Empirical Methods in Natural Language Processing and Computational Natural Language Learning; pp. 995-1005; 2012.
Bogel, Thomas, Strotgen, Jannik, Gertz, Michael; Computational Narratology: Extracting Tense Clusters from Narrative Texts; Proceedings of the 9th International Conference on Language Resources and Evaluation; Reykjavik, Iceland; 2014.
Broekkamp, Hein, Janssen,Tanja, Van Den Bergh, Huub; Is There a Relationship Between Literature Reading and Creative Writing; Journal of Creative Behavior, 43(4); pp. 281-297; Dec. 2009.
Burstein, Jill, Marcu, Daniel, Knight, Kevin; Finding the Write Stuff: Automatic Identification of Discourse Structure in Student Essays; IEEE Intelligent Systems: Special Issue on Advances in Natural Language Processing, 18 (1); pp. 32-39; 2003.
Celikyilmaz, Asli, Hakkani-Tur, Dilek, He, Hua, Kondrak, Greg, Barbosa, Denilson; The Actor-Topic Model for Extracting Social Networks in Literary Narrative; NIPS Workshop: Machine Learning for Social Computing; 2010.
Chambers, Nathanael, Jurafsky, Dan; Unsupervised Learning of Narrative Event Chains; Proceedings of the Association for Computational Linguistics: Human Language Technologies; Columbus, OH; pp. 789-797; Jun. 2008.
Chambers, Nathanael, Jurafsky, Dan; Unsupervised Learning of Narrative Schemes and Their Participants; Proceedings of the 47th Annual Meeting of the ACL and the 4th IJCNLP of the AFNLP; Suntec, Singapore; pp. 602-610; Aug. 2009.
Chambers, Nathanael; Event Schema Induction with a Probabilistic Entity-Driven Model; Proceedings of the Conference on Empirical Methods in Natural Language Processing; Seattle, WA; pp. 1797-1807; Oct. 2013.
Charniak, Eugene; Toward a Model of Children's Story Comprehension; MIT Artificial Intelligence Laboratory, Technical Report 266; 1972.
Chaturvedi, Snigdha, Goldwasser, Dan, Daume, Hal; Ask, and Shall You Receive? Understanding Desire Fulfillment in Natural Language Text; Proceedings of the 30th AAAI Conference on Artificial Intelligence; pp. 2697-2703; 2016.
Chaturvedi, Snigdha, Srivastava, Shashank, Daume, Hal, Dyer, Chris; Modeling Evolving Relationships Between Characters in Literary Novels; Proceedings of the 30th AAAI Conference on Artificial Intelligence; pp. 2704-2710; 2016.
Church, Kenneth, Hanks, Patrick; Word Association Norms, Mutual Information, and Lexicography; Computational Linguistics, 16(1); pp. 22-29; 1990.
Cohen, Jacob; Weighted Kappa: Nominal Scale Agreement with Provision for Scaled Disagreement or Partial Credit; Psychological Bulletin, 70(4); pp. 213-220; Oct. 1968.
De Marneffe, Marie-Catherine, Manning, Christopher; The Stanford Typed Dependencies Representation; COLING Workshop on Cross-Framework and Cross-Domain Parser Evaluation; 2008.
Efron, Bradley, Tibshirani, Robert; An Introduction to the Bootstrap; Chapman and Hall; 1993.
Elliot, Scott; IntelliMetric: From Here to Validity; Ch. 5 in Auotmated Essay Scoring; pp. 71-86; 2003.
Elsner, Micha; Character-based Kernels for Novelistic Plot Structure; Proceedings of the 13th Conference of the Association for Computational Linguistics; Avignon, France; pp. 634-644; Apr. 2012.
Elson, David, Dames, Nicholas, McKeown, Kathleen; Extracting Social Networks from Literary Fiction; Proceedings of the 48th Annual Meeting of the Association for Computational Linguistics; Uppsala, Sweden; pp. 138-147; Jul. 2010.
Elson, David; Modeling Narrative Discourse; Ph.D. Thesis, Columbia University; 2012.
Farra, Noura, Somasundaran, Swapna, Burstein, Jill; Scoring Persuasive Essays Using Opinions and Their Targets; Proceedings of the 10th Workshop on Innovative Use of NLP for Building Educational Applications; Denver, CO; pp. 64-74; Jun. 2015.
Finlayson, Mark; Learning Narrative Structure from Annotated Folktales; Ph.D. Thesis, Massachusetts Institute of Technology; Feb. 2012.
Finlayson, Mark; A Survey of Corpora in Computational and Cognitive Narrative Science; Sprache and Datenverarbeitung (International Journal for Language Data Processing), 37(1-2); pp. 113-141; 2013.
Fludernik, Monika; An Introduction to Narratology; Routledge: London, UK; 2006.
Francisco, Virginia, Hervas, Raquel, Peinado, Federico, Gervas, Pablo; EmoTales: Creating a Corpus of Folk Tales with Emotional Annotations; Language Resources and Evaluation, 46(3); pp. 341-381; Sep. 2012.
Gillam, Ronald, Pearson, Nils; TNL: Test of Narrative Language; Pro-Ed; 2004.

(56) References Cited

OTHER PUBLICATIONS

Goyal, Amit, Riloff, Ellen, Daume, Hal; Automatically Producing Plot Unit Representations for Narrative Text; Proceedings of the 2010 Conference on Empirical Methods in Natural Language Processing; 2010.

Halliday, M.A.K., Martin, J.R.; Writing Science: Literacy and Discursive Power; The Falmer Press: London, UK; 1993.

Halpin, Harry, Moore, Johanna; Event Extraction in a Plot Advice Agent; Proceedings of the 21st International Conference on Computational Linguistics and 44th Annual Meeting of the ACL; pp. 857-864; Jul. 2006.

Hartung, Franziska, Burke, Michael, Hagoort, Peter, Willems, Roel; Taking Perspective: Personal Pronouns Affect Experiential Aspects of Literary Reading; PLoS One, 11(5); May 2016.

Hovy, Eduard, Mitamura, Teruko, Palmer, Martha; Proceedings of the 1st Workshop on EVENTS: Definition, Detection, Coreference, and Representation; Association for Computational Linguistics; 2013.

Hovy, Eduard, Mitamura, Teruko, Palmer, Martha; Proceedings of the 3rd Workshop on EVENTS: Definition, Detection, Coreference, and Representation; Association for Computational Linguistics; Jun. 2015.

Jans, Bram, Bethard, Steven, Vulic, Ivan, Moens, Marie Francine; Skip N-grams and Ranking Functions for Predicting Script Events; Proceedings of the 13th Conference of the European Chapter of the Association for Computational Linguistics; Avignon, France; pp. 336-344; Apr. 2012.

Beigman Klebanov, Beata, Madnani, Nitin, Burstein, Jill, Somasundaran, Swapna; Content Importance Models for Scoring Writing From Sources; Proceedings of the 52nd Annual Meeting of the Association for Computational Linguistics; Baltimore, MD; pp. 247-252; Jun. 2014.

Klein, Stephen, Stecher, Brian, Shavelson, Richard, McCaffrey, Daniel, Ormseth, Tor, Bell, Robert, Comfort, Kathy, Othman, Abdul; Analytic Versus Holistic Scoring of Science Performance Tasks; Applied Measurement in Education, 11(2); pp. 121-137; Dec. 2009.

Landauer, Thomas, Laham, Darrell, Foltz, Peter; Automated Scoring and Annotation of Essays with the Intelligent Essay Assessor; Ch. 6, In Automated Essay Scoring: A Cross-Disciplinary Perspective, M. Shermis and J. Burstein (Eds.); pp. 87-112; 2003.

Landis, J. Richard, Koch, Gary; The Measurement of Observer Agreement for Categorical Data; Biometrics, 33; pp. 159-174; Mar. 1977.

Lee, Yong-Won, Gentile, Claudia, Kantor, Robert; Toward Automated Multi-Trait Scoring of Essays: Investigating Links Among Holistic, Analytic, and Text Feature Scores; Applied Linguistics, 31(3); pp. 391-417; Jul. 2010.

Lehnert, Wendy; Plot Units and Narrative Summarization; Cognitive Science, 4; pp. 293-331; 1981.

Mani, Inderjeet; Computational Modeling of Narrative; Synthesis Lectures on Human Language Technologies, 5(3); pp. 1-142; Dec. 2012.

Manning, Christopher, Surdeanu, Mihai, Bauer, John, Finkel, Jenny, Bethard, Steven, McClosky, David; The Stanford CoreNLP Natural Language Processing Toolkit; Association for Computational Linguistics System Demonstration; pp. 55-60; 2014.

McIntyre, Neil, Lapata, Mirella; Plot Induction and Evolutionary Search for Story Generation; Proceedings of the 48th Annual Meeting of the Association for Computational Linguistics; Uppsala, Sweden; pp. 1562-1572; Jul. 2010.

McKeough, Anne, Genereaux, Randy, Jeary, Joan; Structure, Content, and Language Usage: How Do Exceptional and Average Storywriters Differ?; High Ability Studies, 17(2); pp. 203-223; Dec. 2006.

Mentzell Ryder, Phyllis, Vander Lei, Elizabeth, Roen, Duane; Audience Considerations for Evaluating Writing; Ch. 3 in Evaluating Writing: The Role of Teachers' Knowledge About Text, Learning, and Culture, C. Cooper & L. Odell, Eds.; pp. 53-71; 1999.

Mesgar, Mohsen, Strube, Michael; Lexical Coherence Graph Modeling Using Word Embeddings; Proceedings of the NAACL-HLT; San Diego, CA; pp. 1414-1423; Jun. 2016.

Miller, John, Chapman, Robin; Systematic Analysis of Language Transcripts (SALT); Language Analysis Laboratory; 1985.

Mitamura, Teruko, Hovy, Eduard, Palmer, Martha; Proceedings of the 2nd Workshop on EVENTS: Definition, Detection, Coreference, and Representation; Association for Computational Linguistics; Baltimore, MD; Jun. 2014.

Mostafazadeh, Nasrin, Chambers, Nathanael, He, Xiadong, Parikh, Devi, Batra, Dhruv, Kohli, Pushmeet, Vanderwende, Lucy, Allen, James; A Corpus and Cloze Evaluation for Deeper Understanding of Commonsense Stories; Proceedings of the 2016 Conference of the North American Chapter of the Association for Computational Linguistics: Human Language Technologies; San Diego, CA; pp. 839-849; Jun. 2016.

Napoles, Courtney, Gormley, Matthew, Van Durme, Benjamin; Annotated Gigaword; Proceedings of the Joint Workshop on Automatic Knowledge Base Construction & Web-scale Knowledge Extraction; Montreal, Canada; pp. 95-100; Jun. 2012.

Nguyen, Huy, Litman, Diane; Improving Argument Mining in Student Essays by Learning and Exploiting Argument Indicators Versus Essay Topics; FLAIRS Conference; pp. 485-490; 2016.

Nguyen, Kiem-Hieu, Tannier, Xavier, Ferret, Olivier, Besancon, Romaric; Generative Event Schema Induction with Entity Disambiguation; Proceedings of the 53rd Annual Meeting of the Association for Computational Linguistics and the 7th International Joint Conference on Natural Language Processing; Beijing, China; pp. 188-197; Jul. 2015.

Oatley, Keith; Meetings of Minds: Dialogue, Sympathy, and Identification, in Reading Fiction; Poetics, 26; pp. 439-454; 1999.

Olinghouse, Natalie, Leaird, Jacqueline; The Relationship Between Measures of Vocabulary and Narrative Writing Quality in Second- and Fourth-Grade Students; Reading and Writing, 22(5); pp. 545-565; May 2009.

O'Loughlin, Kieran; Lexical Density in Candidate Output on Direct and Semi-Direct Versions of an Oral Proficiency Test; Language Testing 12; pp. 217-237; Jul. 1995.

Ouyang, Jessica, McKeown, Kathleen; Modeling Reportable Events as Turning Points in Narrative; Proceedings of the 2015 Conference on Empirical Methods in Natural Language Processing; Lisbon, Portugal; pp. 2149-2158; Sep. 2015.

Page, Ellis Batten; Computer Grading of Student Prose, Using Modern Concepts and Software; The Journal of Experimental Education, 62(2); pp. 127-142; Winter 1994.

Palmer, Martha, O'Gorman, Tim, Mitamura, Teruko, Hovy, Eduard; Proceedings of the 4th Workshop on EVENTS: Definition, Detection, Coreference, and Representation; Association for Computational Linguistics; San Diego, CA; 2016.

Parker, Robert, Graff, David, Kong, Junbo, Chen, Ke, Maeda, Kazuaki; English Gigaword Fifth Edition, LDC2011T07; Linguistic Data Consortium; 2011.

Passonneau, Rebecca, Goodkind, Adam, Levy, Elena; Annotation of Children's Oral Narrations: Modeling Emergent Narrative Skills for Computational Applications; FLAIRS Conference; pp. 253-258; 2007.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

Peterson, Douglas, Gillam, Sandra Liang, Gillam, Ronald; Emerging Procedures in Narrative Assessment: The Index of Narrative Complexity; Topics in Language Disorders, 28(2); pp. 115-130; Apr.-Jun. 2008.

Prasad, Rashmi, Dinesh, Nikhil, Lee, Alan, Miltsakaki, Eleni, Robaldo, Livio, Joshi, Aravind, Webber, Bonnie; The Penn Discourse TreeBank 2.0; Proceedings of the LREC; 2008.

Prince, Gerald; A Grammar of Stories: An Introduction; Mouton, The Hague; 1973.

(56) References Cited

OTHER PUBLICATIONS

Reagan, Andrew, Mitchell, Lewis, Kiley, Dilan, Danforth, Christopher, Sheridan Dodds, Peter; The Emotional Arcs of Stories are Dominated by Six Basic Shapes; EPJ Data Science, 5(1); 2016.
Richardson, Matthew, Burges, Christopher, Renshaw, Erin; MCTest: A Challenge Dataset for the Open-Domain Machine Comprehension of Text; Proceedings of the 2013 Conference on Empirical Methods in Natural Language Processing; Seattle, WA; pp. 193-203; Oct. 2013.
Rimmon-Kenan, Shlomith; Narrative Fiction: Contemporary Poetics; Routledge, London; 2002.
Schank, Roger, Abelson, Robert; Scripts, Plans, Goals and Understanding: An Inquiry into Human Knowledge Structures; Lawrence Erlbaum: Hillsdale, NJ; 1977.
Shermis, Mark, Burstein, Jill; Handbook of Automated Essay Evaluation: Current Applications and New Directions; Routledge Academic; 2013.
Smith, Carlota; Aspectual Entities and Tense in Discourse; In Aspectual Inquiries, P.. Kempchinsky & R. Slabakova, Eds.; Springer, Netherlands; 2005.
Somasundaran, Swapna, Burstein, Jill, Chodorow, Martin; Lexical Chaining for Measuring Discourse Coherence Quality in Test-taker Essays; Proceedings of COLING; Dublin, Ireland; pp. 950-961; Aug. 2014.
Somasundaran, Swapna, Lee, Chong Min, Chodorow, Martin, Wang, Xinhao; Automated Scoring of Picture-Based Story Narration; Proceedings of the 10th Workshop on Innovative Use of NLP for Building Educational Applications; Denver, CO; pp. 42-48; Jun. 2015.
Somasundaran, Swapna, Riordan, Brian, Gyawali, Binod, Yoon, Su-Youn; Evaluating Argumentative and Narrative Essays Using Graphs; Proceedings of COLING 2016, the 26th International Conference on Computational Linguistics: Technical Papers; Osaka, Japan; pp. 1568-1578; Dec. 2016.
Stab, Christian, Gurevych, Iryna; Recognizing Insufficiently Supported Arguments in Argumentative Essays; Proceedings of the 15th Conference of the European Chapter of the Association for Computational Linguistics: vol. 1, Long Papers; Valencia, Spain; pp. 980-990; Apr. 2017.
Stein, Nancy, Glenn, Christine; An Analysis of Story Comprehension in Elementary School Children: A Test of a Schema; New Directions in Discourse Processing; 1979.
Strong, Carol, Mayer, Mercer, Mayer, Marianna; The Strong Narrative Assessment Procedure (SNAP); Thinking Publications; 1998.
Swanson, Reid, Rahimtoroghi, Elahe, Corcoran, Thomas, Walker, Marilyn; Identifying Narrative Clause Types in Personal Stories; Proceedings of the SIGDIAL; Philadelphia, PA; pp. 171-180; Jun. 2014.
Ure, Jean; Lexical Density and Register Differentiation; In Applications of Linguistics, G. Perren & J.L.M. Trim, Eds.; Cambridge University Press, London; pp. 443-452; 1971.
Valls-Vargas, Josep, Zhu, Jichen, Ontanon, Santiago; Toward Automatic Role Identification in Unannotated Folk Tales; Proceedings of the 10th Annual AAAI Conference on Artificial Intelligence and Interactive Digital Entertainment, pp. 188-194; 2014.
Vendler, Zeno; Linguistics and Philosophy; Cornell University Press: Ithaca, NY; 1967.
Ware, Stephen, Harrison, Brent, Young, Michael, Roberts, David; Initial Results for Measuring Four Dimensions of Narrative Conflict; AAAI Technical Report, WS-11-18; pp. 115-122; 2011.
Wiebe, Janyce; Tracking Point of View in Narrative; Computational Linguistics, 20(2); pp. 233-287; 1994.
Wilson, Theresa, Wiebe, Janyce, Hoffmann, Paul; Recognizing Contextual Polarity in Phrase-Level Sentiment Analysis; Proceedings of the Human Language Technology Conference and Conference on Empirical Methods in Natural Language Processing (HLT-EMNLP); pp. 347-354; 2005.
Yu, Guoxing; Lexical Diversity in Writing and Speaking Task Performances; Applied Linguistics, 31(2); pp. 236-259; May 2010.

* cited by examiner

PLATFORM FOR ADMINISTERING AND EVALUATING NARRATIVE ESSAY EXAMINATIONS

CROSS-REFERENCE TO RELATED APPLICATIONS

This application claims priority to U.S. Provisional Application No. 62/523,338, filed Jun. 22, 2017, the entirety of which is herein incorporated by reference.

TECHNICAL FIELD

The technology described herein relates to automated essay examination administration and scoring and more particularly to evaluation of narrative quality in examinee writing.

BACKGROUND

Narratives, which include personal experiences, and stories, real or imagined, is a medium of language acquisition from the very early stages of a child's life. Narratives are employed in various capacities in school instruction and assessments. For example, the Common Core State Standards, an educational initiative in the United States that details what students from kindergarten to grade 12 should know in English language arts (ELA) and mathematics at the end of each grade, employs literature/narratives as one of its three language arts genres. This makes automated methods for evaluating narrative essays at scale important. However, automated scoring of narrative essays is a challenging area, and one that has not been explored extensively in NLP research. Research in automated essay scoring has previously focused on informational, argumentative, persuasive and source-based writing constructs.

SUMMARY

Systems and methods are provided for processing a response to essay prompts that request a narrative response. A data structure associated with a narrative essay is accessed. The essay is analyzed to generate an organization subscore, where the organization subscore is generated using a graph metric by identifying content words in each sentence of the essay and populating a data structure with links between related content words in neighboring sentences, wherein the organization subscore is determined based on the links. The essay is analyzed to generate a development subscore, where the development subscore is generated using a transition metric by accessing a transition cue data store and identifying transition words in the essay, wherein the development subscore is based on a number of words in the essay that match words in the transition cue data store. A narrative quality metric is determined based on the organization subscore and the development subscore, where the narrative quality metric is stored in a computer readable medium and is outputted for display on a graphical user interface, transmitted across a computer network, or printed.

As another example, a system for processing a response to essay prompts that request a narrative response includes one or data processors and a computer-readable medium encoded with instructions for commanding the one or more processors to execute steps. In the steps, a data structure associated with a narrative essay is accessed. The essay is analyzed to generate an organization subscore, where the organization subscore is generated using a graph metric by identifying content words in each sentence of the essay and populating a data structure with links between related content words in neighboring sentences, wherein the organization subscore is determined based on the links. The essay is analyzed to generate a development subscore, where the development subscore is generated using a transition metric by accessing a transition cue data store and identifying transition words in the essay, wherein the development subscore is based on a number of words in the essay that match words in the transition cue data store. A narrative quality metric is determined based on the organization subscore and the development subscore, where the narrative quality metric is stored in a computer readable medium and is outputted for display on a graphical user interface, transmitted across a computer network, or printed.

As a further example, a computer-readable medium is encoded with instructions for commanding one or more data processors to execute a method for processing a response to essay prompts that request a narrative response. In the method, a data structure associated with a narrative essay is accessed. The essay is analyzed to generate an organization subscore, where the organization subscore is generated using a graph metric by identifying content words in each sentence of the essay and populating a data structure with links between related content words in neighboring sentences, wherein the organization subscore is determined based on the links. The essay is analyzed to generate a development subscore, where the development subscore is generated using a transition metric by accessing a transition cue data store and identifying transition words in the essay, wherein the development subscore is based on a number of words in the essay that match words in the transition cue data store. A narrative quality metric is determined based on the organization subscore and the development subscore, where the narrative quality metric is stored in a computer readable medium and is outputted for display on a graphical user interface, transmitted across a computer network, or printed.

DETAILED DESCRIPTION

Figure 1:
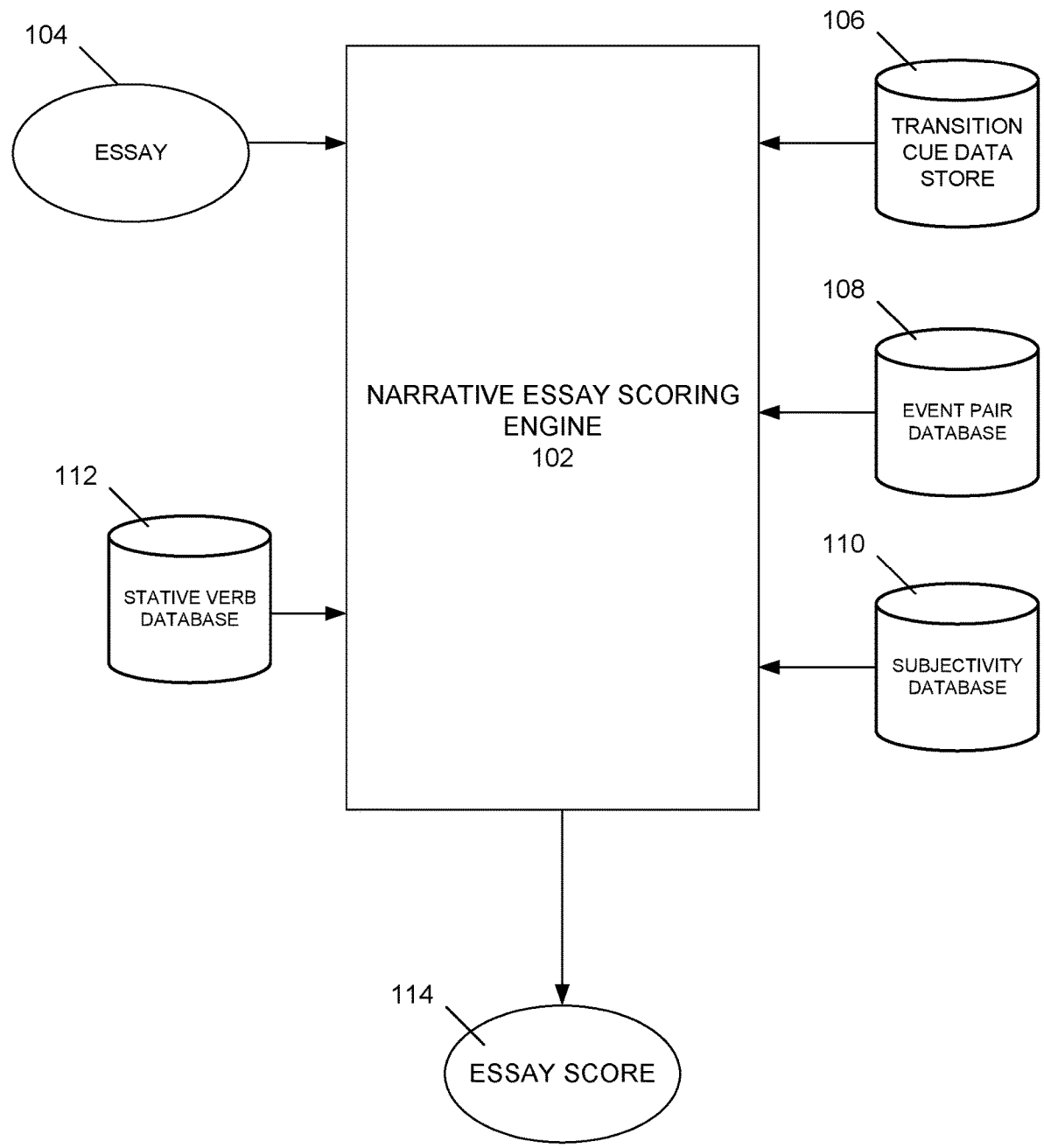
FIG. 1 is a block diagram depicting a computer-implemented system for processing a response to essay prompts that request a narrative response.

Systems and methods as described herein automatically evaluate the quality of narratives in student-generated essays. Essays are typically evaluated by human raters according to a rubric. That rubric identifies characteristics that the evaluator should look for in an essay that indicate the quality level of the rubric. In many rubrics, certain of the characteristics are subjective characteristics that require human judgment. Those subjective characteristics are sometimes difficult for a computer evaluation system to determine directly. But other characteristics and metrics of an essay (e.g., essay length, essay part of speech usage) are amenable to computer system extraction, sometimes more efficiently than a human rater can provide.

To develop the various computer evaluation system described herein, a corpus of narrative essays was human rated according to a scoring rubric. A number of computer-amenable metrics were extracted from those essays. Correlations between those computer extracted metrics and the human scores were determined to identify individual computer extracted metrics and combinations thereof that provided strong approximations of human scorings. Scoring models are then developed using those identified metrics. While the output of the scoring models are similar to those provided by human raters, the processing performed by the scoring models is vastly different from how a human rater would evaluate an essay. For example, certain metrics extracted by the computer system are not calculateable by a human rater, especially on the mass scale of narrative essay scoring desired by test taking bodies (e.g., scoring hundred or many thousands of narrative essays in a day). In this manner, the computer evaluation system described herein provides human-evaluator-like functionality, which would otherwise not be possible from a generic computer system, while performing the human-mimicked process in a very different manner than any human would or could rate the narrative essays.

Regarding the rubric, there are a number of ways to analyze stories and assess narratives. In one example, narratives are assessed on three dimensions: a purpose/organization dimension, a development/elaboration dimension, and a convention dimension. The purpose/organization dimension focuses on how the story is organized in general. It focuses on event coherence, on whether the story has a coherent start and ending, and whether there is a plot to hold all the pieces of the story together. The purpose/organization dimension was scored by the human raters on a 1-4 integer scale. An essay scoring 4 met the following criteria. The organization of the narrative is fully sustained and the focus is clear and maintained throughout: The essay has an effective plot helps to create a sense of unity and completeness. The essay effectively establishes a setting, narrator/characters, and/or point of view. The essay exhibits consistent use of a variety of transitional strategies to clarify the relationships between and among ideas. The essay has a strong connection between and among ideas. The essay has natural, logical sequence of events from beginning to end, and the essay contains an effective opening and closure for audience and purpose The development/elaboration dimension focuses on how the story is developed. It evaluates whether the story provides vivid descriptions, and whether there is character development. This dimension is judged along a scale of 1-4 integer score points, with 4 being the perfect score. An essay scoring 4 met the following criteria. The narrative, real or imagined. provides thorough, effective elaboration using relevant details, dialogue, and/or description. The essay's experiences, characters, setting and/or events are clearly developed. Connections to source materials may enhance the narrative. The essay includes effective use of a variety of narrative techniques that advance the story or illustrate the experience. And the essay includes effective use of sensory, concrete, and figurative language that clearly advances the purpose.

The conventions dimension evaluates the language proficiency. This dimension is judged along a scale of 1-3 integer score points, with 3 being the perfect score. An essay scoring 3 demonstrates an adequate command of conventions, such as adequate use of correct sentence formation, punctuation, capitalization, grammar usage, and spelling.

The human subscores can be rolled up to provide higher level metrics. In one example, a narrative quality score is generated by adding the organization and development subscores. In another example, a holistic score is generated by adding the organization, development, and conventions subscores.

As described above, a number of computer-extractable metrics were also extracted from the human scored essays. In one example, a set of transition features were extracted. Effective organization of ideas and events is typically achieved with the use of discourse markers. In order to encode effective transitioning, a transition cue lexicon was compiled and constructed features were developed based on it. Two approaches were used to compile the lexicon. First, we discourse cues were extracted from the Penn Discourse Treebank (PDTB) manual. This provided a list of 234 transition cues from different senses (e.g. Elaboration, Contingency, Temporal, Synchrony). Next, a list of transition cues were collected from the web, mining websites that provide tips on good essay/narrative writing. This list, with a total of 484 unigrams and multi-word expressions, is focuses on cues that are used commonly to write stories (e.g. cues that provide locational or temporal connections). The category or sense in which the cue was found was also recorded (e.g. time, sequence, contradiction, location and opposition). This approach augmented the lexicon with transition cues not found in PDTB, such as "in the same fashion", "what's more", "balanced against", "in the background." Two features were extracted from each essay based on the lexicons: 1. the number of cues in the essay and 2. The number of cues in the essay divided by the essay length.

In one example, event-based features were extracted. Events are the building blocks of narratives, and good story-telling involves stringing together events skillfully. An event-based feature set, Event, can be constructed to capture event cohesion and coherence by building on previous work on narrative schemas. A database of event pairs is constructed from the GigaWord Fifth Edition corpus. Specifically, the Annotated Gigaword distribution was used, which has been automatically annotated with typed dependency information. Events are defined as verbs in a text (excluding the verbs "be/have/do") and pairs of events are defined as those verbs that share arguments in the text. In one example, scope is limited to the following set of (typed dependency) arguments: nsubj, dobj, nsubjpass, xsubj, csubj, csubjpass. To estimate event cohesion in a narrative essay all event pairs from the essay are extracted (e.g., after preprocessing with the Stanford Core NLP toolkit). Event tokens from the essay are linked into pairs when they share a filler in their arguments. In one example, co-reference resolution is used for matching fillers of verb-argument slots.

For all event pairs extracted from an essay, the events database is queried to retrieve the pair association value (e.g., the point-wise mutual information). Three quantitative measures are defined to encode event cohesion: (1) total count of event pairs in essay; (2) proportion of in-text event-pairs that are actually found in the events database; (3) proportion of in-text event-pairs that have PMI above threshold (PMI values are obtained from the database (e.g., PMI>=2).

In addition to overall event cohesion, aspects of coherent event sequencing are captured. For this, event chains are computed, which are defined as sequences of events that share the same actor/object (in subject or direct object role). Specifically, the following additional features are encoded in the event set, in one example: (4) the length of the longest chain found in the essay (i.e. number of event pairs in the chain); (5) length of the longest chain, normalized by the log of essay length (log of word count); (6) the score of the longest chain (computed as sum of PMI values for all links (event pairs) of the chain; (7) the length of the second longest chain found in the essay; (8) length of the second longest chain, normalized by the log of essay length; (9) the score of the highest scoring chain is the essay; (10) the score of the highest scoring chain is the essay, normalized by the length of the chain; (11) the score of the second highest scoring chain in the essay; (12) the score of the second highest scoring chain in the essay, normalized by the chain length; (13) the score of the lowest scoring chain is the essay; (14) the score of the lowest scoring chain in the essay, normalized by the length of the chain; (15) the sum of scores for all chains in the essay; (16) the sum of chain-length-normalized scores for all chains in the essay.

Subjectivity features may also be extracted. Evaluative and subjective language is used to describe characters (e.g. foolish, smart), situations (e.g. grand, impoverished) and characters' private states (e.g. thoughts, beliefs, happiness, sadness). These are evidenced when characters and storylines are well developed. In one example, two lexicons are used for encoding sentiment and subjective words in the essays: (1) the MPQA subjectivity lexicon and (2) a sentiment lexicon, ASSESS, developed for essay scoring. The MPQA lexicon associates a positive/negative/neutral polarity category to its entries, while the ASSESS lexicon assigns a positive/negative/neutral polarity probability to its entries. A word from the ASSESS lexicon is considered to be polar if the sum of positive and negative probabilities is greater than 0.65. The two lexicons complement each other. The neutral category of the MPQA lexicon comprises of subjective terms indicating speech acts and private states (e.g. view, assess, believe), which is valuable for our purposes. The neutral category of ASSESS lexicon are non-subjective words (e.g. woman, technologies), which we ignore. The polar entries of the two lexicons differ too—ASSESS provides polarity for words based on the emotions that they evoke. For example, alive, awakened and birth are assigned a high positive probability while crash, bombings and cyclone have high negative probability.

A subjectivity feature set is constructed, in one example, that includes the following features: (1) A binary value indicating whether the essay contains any polar words from the ASSESS lexicon; (2) the number of polar words from the ASSESS lexicon in the essay; (3) A binary value indicating whether the essay contains any polar words from the MPQA lexicon; (4) the number of polar words from the MPQA lexicon found in the essay; (5) a binary value indicating whether the essay contains any neutral words from the MPQA lexicon; (6) the number of neutral words from the MPQA lexicon found in the response.

In another example, a detail features are also extracted. Providing specific details such as names to characters, and describing the story elements helps in developing the narrative and providing depth to the story. For example, "Jack hesitantly entered the long dark corridor." develops the narrative more than "The boy entered the corridor.", even though the two sentences describe the same event in the story. Proper nouns, adjectives and adverbs come into play when a writer provides descriptions. A details feature set can be extracted. In one example, that set can comprise one or more of a total of 6 features encoding separately, the presence (3 binary features) and count (3 integer features) of proper nouns, adjectives and adverbs.

In an example, graph features are also extracted. Graph statistics can be effective for capturing development and coherence in essays. Graphs can be constructed from essays by representing each content word (word type) in a sentence as a node in the graph. Links can be drawn between words belonging to adjacent sentences. Features based on connectivity, shape and page-rank can be extracted, giving a total of up to 19 graph features. Specifically, the features can include: percentage of nodes with degrees one, two and three; the highest, second-highest and median degree in the graph; the highest degree divided by the total number of links; the top three page-rank values in the graph, their respective negative logarithms, and their normalized versions; the median page-rank value in the graph, its negative log and normalized version.

In an embodiment, content word usage features are extracted. Content word usage, also known as lexical density, refers to the amount of open-class (content words) used in an essay. The greater proportion of content words in a text, the more difficult or advanced it is and too much lexical density is detrimental to clarity. To find content words, the Stanford Core NLP Tools-toolkit can be used to automatically tag all essays with part-of-speech tags, and then counted only those words whose tags belong to noun/verb/adjective/adverb categories. The content word feature can be utilized as the inverse of the proportion of content words to all words of an essay.

Pronoun features can also be extracted. The use of pronouns in story writing is traditionally has several important aspects. On one hand, pronouns can indicate the point of view (or perspective) in which the story is written. Perspective is important in both construction and comprehension of narrative. The use of pronouns is also related to reader engagement and immersion. Stories with first person pronouns lead to stronger reader immersion, while stories written in third person lead to stronger reader arousal. Personal pronouns (e.g. I, he, it) and possessive pronouns (e.g. my, his) can be counted, including their appearance in contractions (e.g. he's). For each essay, the counts are normalized by essay length (wordcount). A feature can be encoded using the proportion of first and third person singular pronouns in the essay.

Modal features can also be extracted from essays. As an account of connected events, narratives typically uses the past tense. By contrast, modals appear before un-tensed verbs and generally refer to the present or the future. They express degree of ability (can, could), probability (shall, will, would, may, might), or obligation/necessity (should, must). An overabundance of modals in an essay may be an indication that it is not a narrative or is only marginally so. This idea is captured in a (modal count/word count) metric.

Further, a stative verb metric can be extracted. Stative verbs are verbs that describe states, and are typically contrasted to dynamic verbs, which describe events (actions and activities). In narrative texts, stative verbs are often used in descriptive passages, but they do not contribute to the progression of events in a story. If a text contains too many stative verbs, then it may not have enough of an event sequence, which is a hallmark of a narrative. In one example, a list of 62 English stative verbs from various linguistic resources on the web. Using a morphological toolkit, the list is expanded to include all inflectional forms of those stative verbs. During processing of an essay, verbs are identified by POS tags, and stative verbs by lookup into the list. In one example, the list does not include the verb "to be" and its variants, because this verb has many other functions in English grammar. In one example, copular uses of "to be" are identified and count them as statives. A stative verb feature may be identified as the proportion of stative verbs out of all verbs in a text.

In one example, a corpus of narrative essays was human scored using the rubric (i.e., the rubric having organization, development, contentions sub-scores). The above described metrics were automatically extracted from the essays as well. Correlations between the automatically extracted metrics and the human scores were determined to identify automated metrics that alone or in combination with other metrics provided the best prediction of human scoring for an aspect of the narrative essay.

Regarding the organization sub-score, in one example, the following correlations were identified between automatically extracted metrics and human scores.

| Featureset | QWK |
|---|---|
| Baseline | 0.47 |
| Detail | 0.36 |
| Transition | 0.39 |
| Event | 0.39 |
| Subjectivity | 0.41 |
| Graph | 0.49 |
| Detail + Modal + Pronoun + Content + Graph + Subjectivity + Transition | 0.60 |

In the example, the graph feature alone provided the best predictor of human scoring for the organization subscore. Thus, a model for human scoring of the organization subscore could be formed based on the graph feature alone or the graph feature in combination with one or more other metrics. In one example, the detail, transition, event, and subjectivity metrics performed highly. In one example, a model comprising the detail, modal, pronoun, content, graph, subjective, and transition metrics is generated to score future narrative essays on organization.

Regarding the development sub-score, in one example, the following correlations were identified between automatically extracted metrics and human scores.

| Feature set | QWK |
|---|---|
| Baseline | 0.51 |
| Detail | 0.41 |
| Event | 0.43 |
| Subjectivity | 0.47 |
| Transition | 0.50 |
| Graph | 0.54 |

-continued

| Feature set | QWK |
|---|---|
| Detail + Modal + Content + Graph + Stative + Transition | 0.66 |

In the example, the graph feature alone provided the best predictor of human scoring for the organization subscore. The transition feature alone also provided strong results. Thus, a model for human scoring of the development subscore could be formed based on the graph feature alone or the graph feature in combination with one or more other metrics. A model for human scoring of the development subscore could also be formed based on the transition feature alone or the transition feature in combination with one or more other metrics. In one example, the graph, transition, subjectivity, event, and detail metrics performed highly. In one example, a model comprising the detail, modal, content, graph, stative, and transition metrics is generated to score future narrative essays on organization.

Regarding the conventions sub-score, in one example, the following correlations were identified between automatically extracted metrics and human scores.

| Feature set | QWK |
|---|---|
| Baseline | 0.44 |
| Graph | 0.17 |
| Detail | 0.19 |
| Subjectivity | 0.20 |
| Transition | 0.23 |
| Event | 0.26 |
| Detail + Baseline + Graph | 0.50 |

In the example, the event feature alone provided the best predictor of human scoring for the conventions subscore. Thus, a model for human scoring of the development subscore could be formed based on the event feature alone or the event feature in combination with one or more other metrics. In one example, the event, transition, subjectivity, detail, and graph metrics performed highly. In one example, a model comprising the detail and graph metrics, alone or in combination with other metrics is generated to score future narrative essays on organization.

Regarding the narrative quality score, in one example, the following correlations were identified between automatically extracted metrics and human scores.

| Feature set | QWK |
|---|---|
| Baseline | 0.53 |
| Detail | 0.39 |
| Event | 0.45 |
| Subjectivity | 0.47 |
| Transition | 0.49 |
| Graph | 0.56 |
| Detail + Baseline + Modal + Pronoun + Content + Graph + Stative + Subjectivity + Transition | 0.67 |

In the example, the graph feature alone provided the best predictor of human scoring for the narrative score. Thus, a model for human scoring of the narrative score could be formed based on the graph feature alone or the graph feature in combination with one or more other metrics. In one example, the graph, transition, subjectivity, event, detail, and baseline metrics performed highly. In one example, a model comprising the detail, modal, pronoun, content, graph, stative, subjectivity, and transition metrics, alone or in combination with other metrics is generated to score future narrative essays on organization.

Regarding the holistic quality score, in one example, the following correlations were identified between automatically extracted metrics and human scores.

| Feature set | QWK |
|---|---|
| Baseline | 0.60 |
| Details | 0.41 |
| Events | 0.45 |
| Subjectivity | 0.46 |
| Transition | 0.48 |
| Graph | 0.54 |
| Details + Baseline + Modal + Content + Graph + Subjectivity + Transition | 0.70 |

In the example, the graph feature alone provided the best predictor of human scoring for the holistic score. Thus, a model for human scoring of the narrative score could be formed based on the graph feature alone or the graph feature in combination with one or more other metrics. In one example, the graph, transition, subjectivity, events, and details metrics performed highly. In one example, a model comprising the details, modal, content, graph, subjectivity, and transitions metrics, alone or in combination with other metrics is generated to score future narrative essays on organization.

FIG. 1 is a block diagram depicting a computer-implemented system for processing a response to essay prompts that request a narrative response. A narrative essay scoring engine 102 accesses a data structure 104 associated with a narrative essay. The scoring engine 102 may access one or more data stores 106 that contain data to assist in automatically extracting metrics from the essay 104, such as described above. For example, a transition cue data store 106 may be accessed to access data for automatically extracting transition metrics, an event pair database 108 may be accessed to facilitate generation of event metrics, a subjectivity database 110 may be accessed to aid in automated extraction of subjectivity metrics, and a stative verb database 112 may be accessed to automatically extract stative verb metrics from the essay 104. The narrative essay scoring engine, in one example, determines one or more of an organization subscore, a development subscore, a conventions subscore, a narrative quality metric, and a holistic metric based on the metrics extracted from the essay 104. Those determined subscores and/or metrics are output from the engine 102 as an essay score 114.

Figure 2:
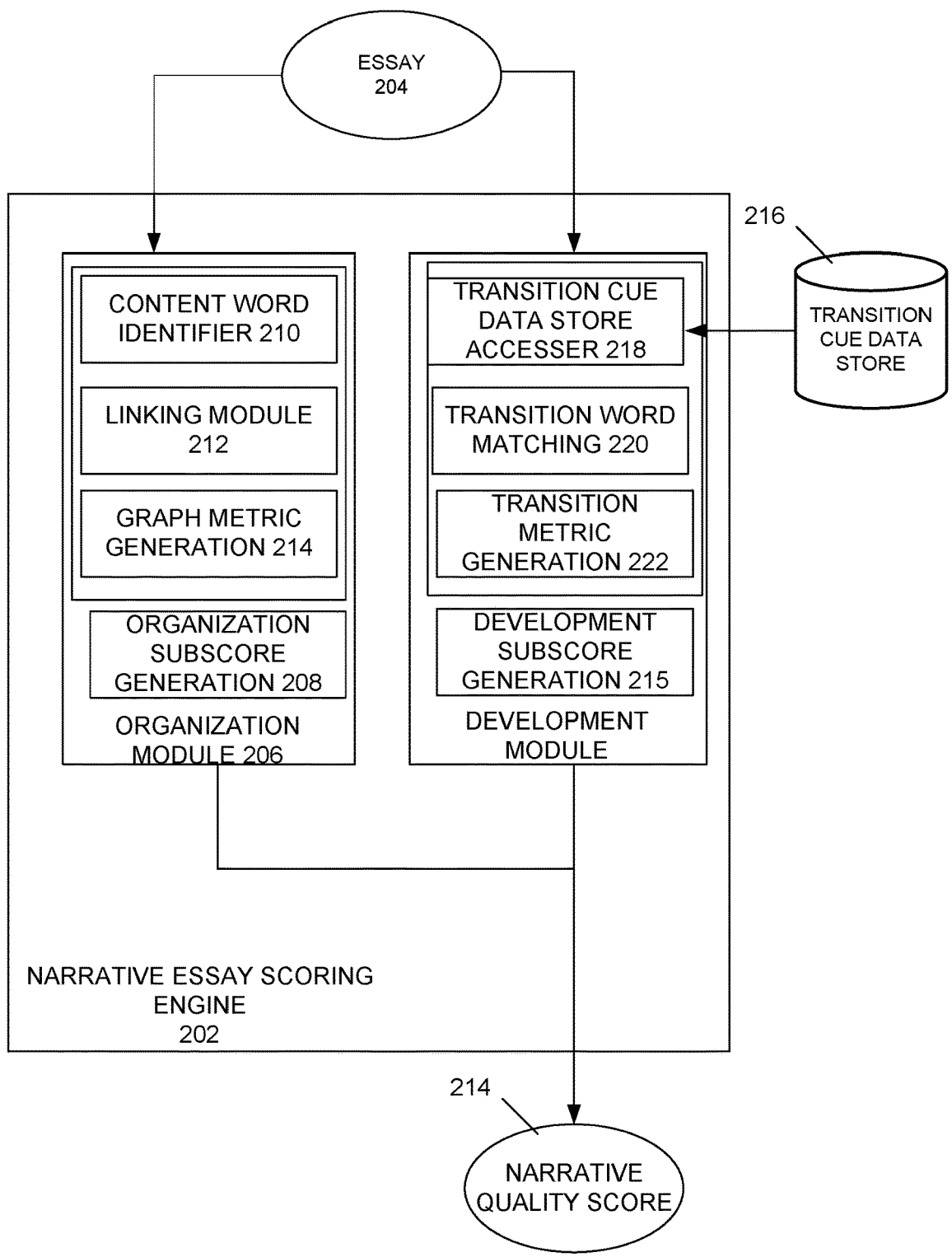
FIG. 2 is a block diagram depicting a computer-implemented system for processing an essay to generate a narrative quality score that is transmitted across a computer network or displayed on a graphical user interface.

FIG. 2 is a block diagram depicting a computer-implemented system for processing an essay to generate a narrative quality score that is transmitted across a computer network or displayed on a graphical user interface. The narrative scoring engine 202 receives a data structure 204 associated with a narrative essay. The engine 202 includes an organization module 206 that generates an organization subscore at 208 based on a plurality of metrics automatically extracted from the essay 204. In the example of FIG. 2, the organization subscore 208 is generated using a graph metric. The graph metric is generated by identifying content words in each sentence of the essay at 210 and at 212 populating a data structure with links between related content words in neighboring sentences. The graph metric is generated at 214 based on the links. In the example of FIG. 2, the development subscore 215 is generated using a transition metric. The transmission metric is generated by accessing a transition cue data store 216 at 218. Data from the transition cue data store 216 is used at 220 to identify transition words in the essay. The transition metric is generated at 222 based on a number of words in the essay 204 that match words in the transition cue data store. The narrative quality score is determined based on the organization subscore 208 and the development subscore 215 (e.g., based on a sum of the two subscores).

Figure 3:
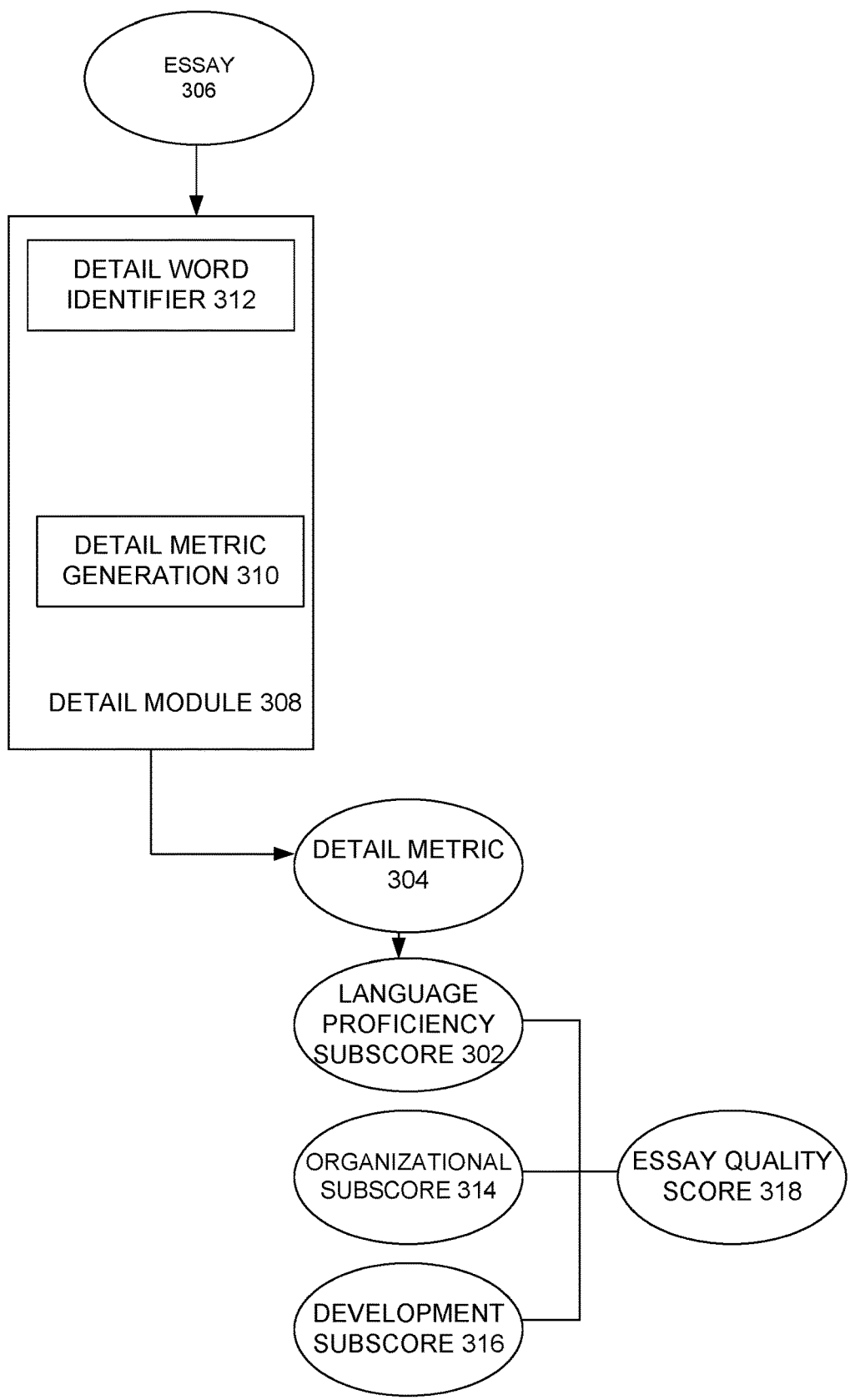
FIG. 3 is a diagram depicting a system for generating a language proficiency score based on a detail metric.

FIG. 3 is a diagram depicting a system for generating a language proficiency score based on a detail metric. In the example, a conventions subscore in the form of a language proficiency subscore 302 is determined based on a detail metric 304 alone or in combination with other metrics automatically extracted from the essay 306. The detail metric 304 is determined by the detail module 308 at 310 by identifying a proportion of words in the essay 306 that are proper nouns, adjectives, or adverbs using the identifier at 312. In one example, the language proficiency subscore 302 is combined with an organizational subscore 314 and a development subscore 316 to determine a holistic essay quality score 318.

Figure 4:
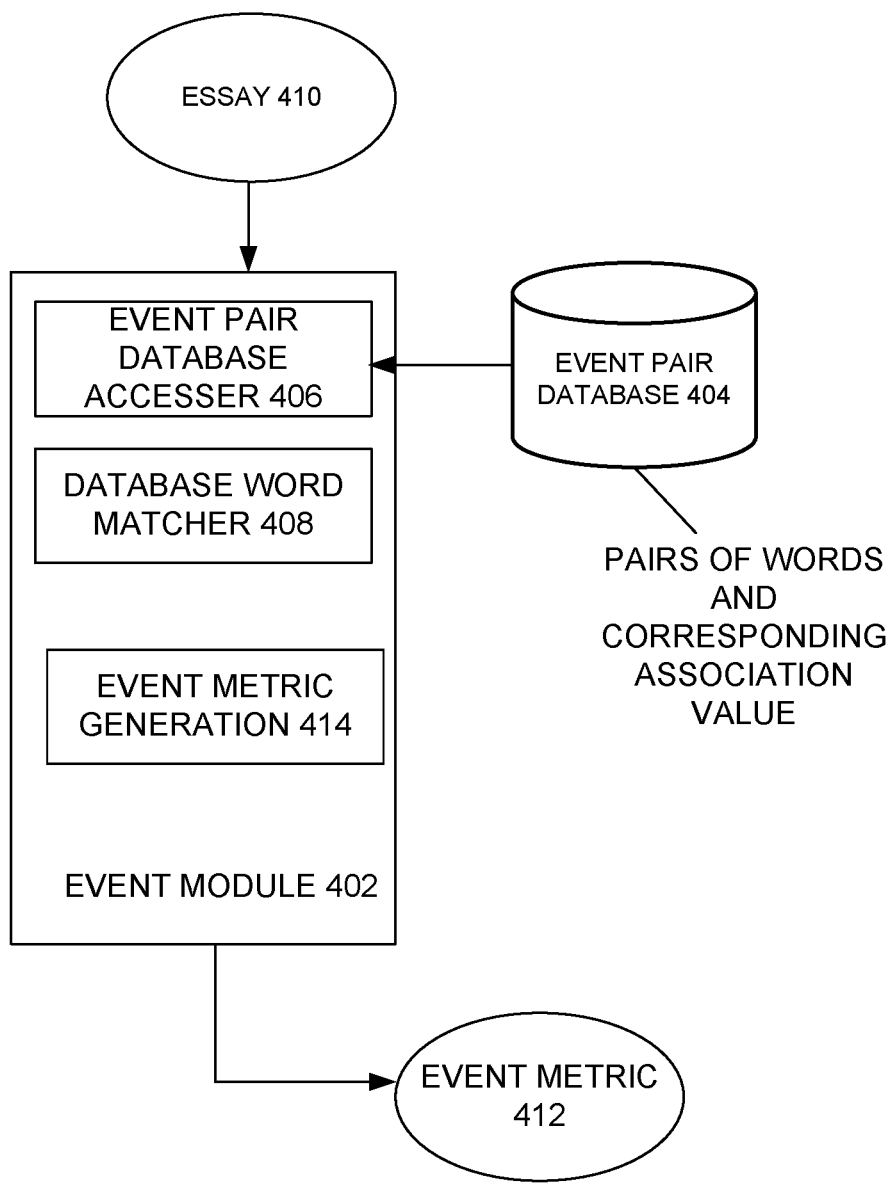
FIG. 4 is a diagram depicting a computer-implemented event module for extracting an event metric from an essay

FIG. 4 is a diagram depicting a computer-implemented event module for extracting an event metric from an essay. The event module 402 accesses an event pair database 404 at 406 that identifies pairs of words and an association value for each pair of words. At 408, the module 402 extracts pairs of words from the essay 410 and determines whether each extracted pair of words is in the event pair database. The event metric 412 is generated at 414 based on a proportion of extracted pairs that are located in the event pair database 404.

Figure 5:
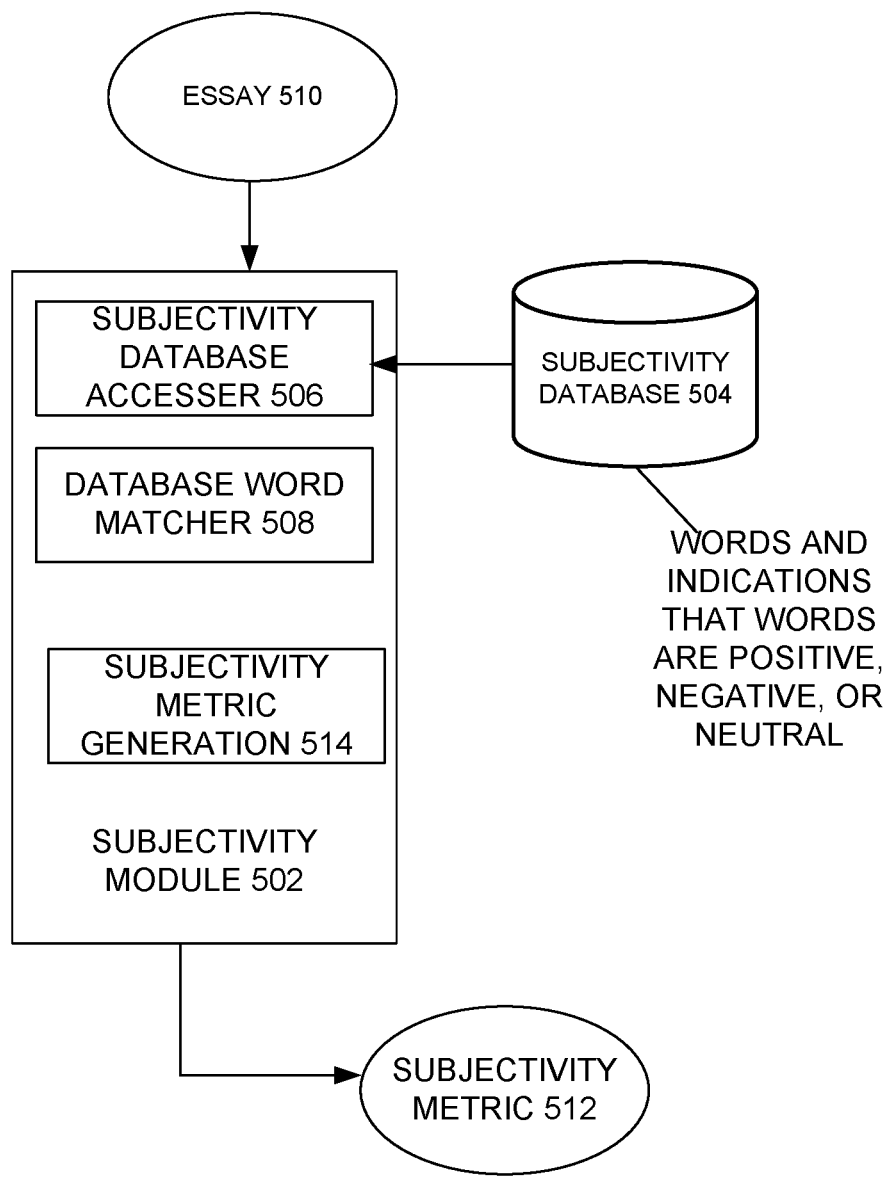
FIG. 5 is a diagram depicting a computer-implemented subjectivity module for extracting a subjectivity metric from an essay.

FIG. 5 is a diagram depicting a computer-implemented subjectivity module for extracting a subjectivity metric from an essay. The subjectivity module 502 accesses a subjectivity database 504 via 506. The subjectivity database includes a plurality of words along with indications of whether the included words are positive words, negative words, or neutral words. The database word matcher 508 matches words in the essay 510 with words in the database 504 and compiles statistics on whether matched words are positive, negative, or neutral. The subjectivity metric 512 is determined at 514 based on a proportion of words in the essay 5510 that are found in the subjectivity database 504 that are indicated as being either positive or negative words.

Figure 6:
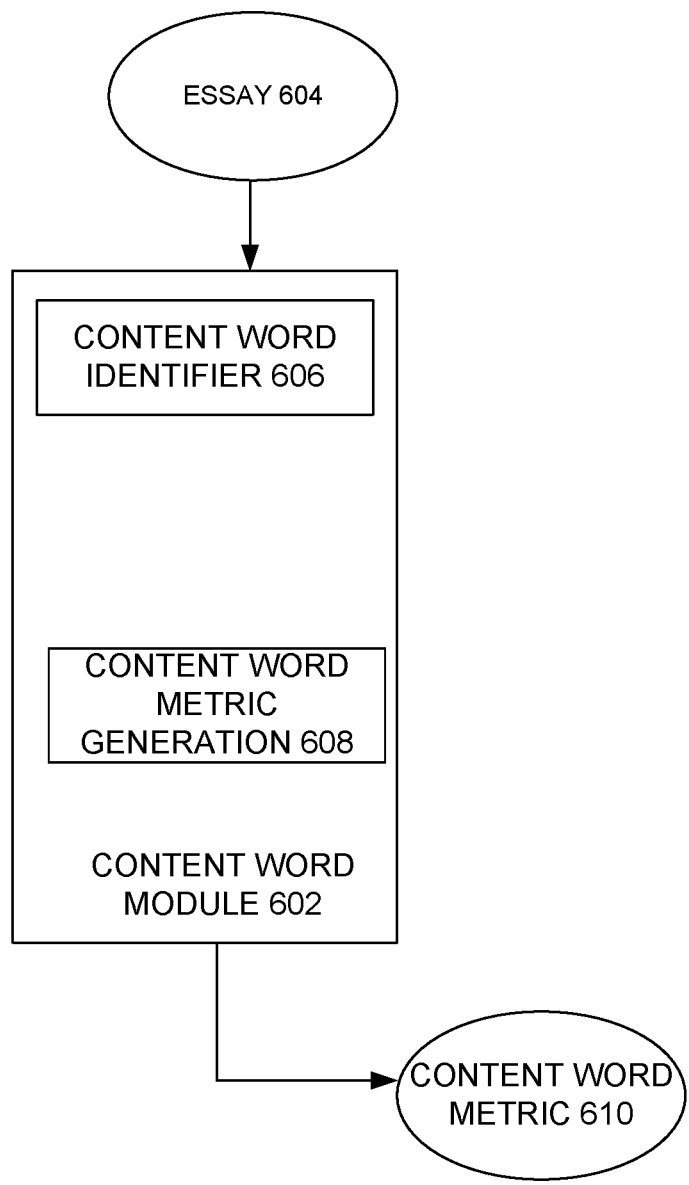
FIG. 6 is a diagram depicting a computer-implemented content word module for extracting a content word metric from an essay.

FIG. 6 is a diagram depicting a computer-implemented content word module for extracting a content word metric from an essay. The content word module 602 accesses the essay 604 and identifies content words in the essay 604. In one example, the content word identifier 606 identifies nouns, verbs, adjectives, and adverbs as content words. At 608, the content word metric 610 is generated based on a proportion of words in the essay 604 that are content words.

Figure 7:
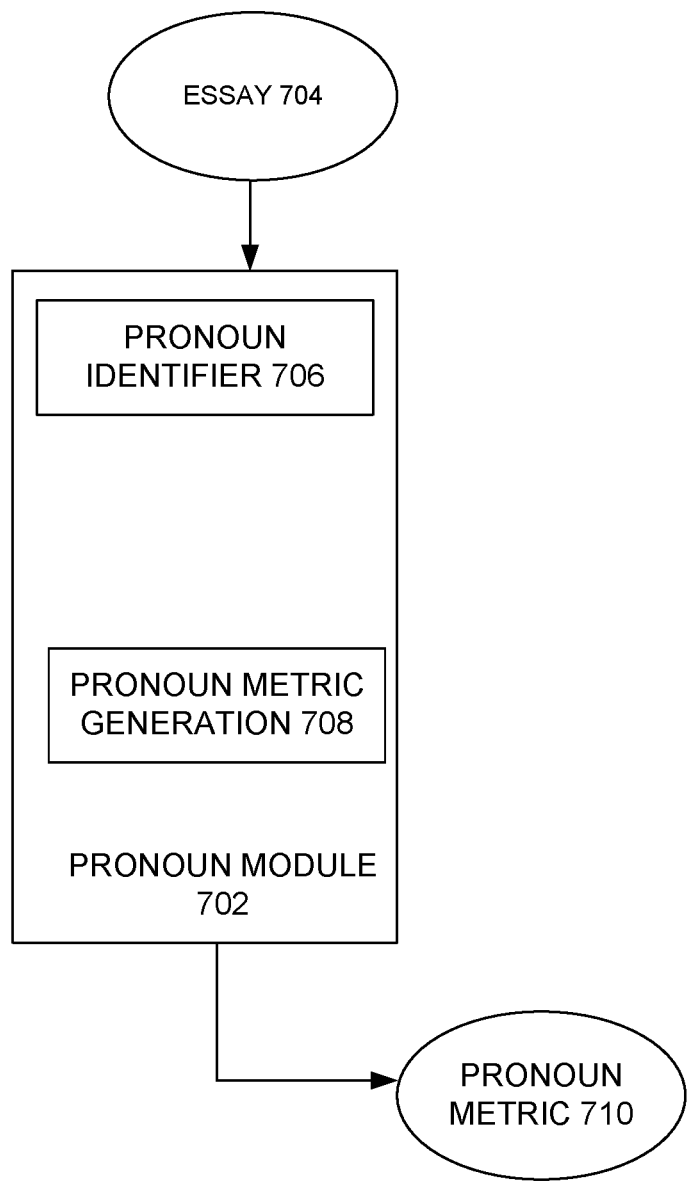
FIG. 7 is a diagram depicting a computer-implemented pronoun module for extracting a pronoun metric from an essay.

FIG. 7 is a diagram depicting a computer-implemented pronoun module for extracting a pronoun metric from an essay. The pronoun module 702 accesses the essay 704 and identifies pronouns in the essay 704. In one example, the pronoun identifier 706 identifies first and third person singular pronouns. At 708, the pronoun metric 710 is generated based on a proportion of words in the essay 704 that are identified as pronouns.

Figure 8:
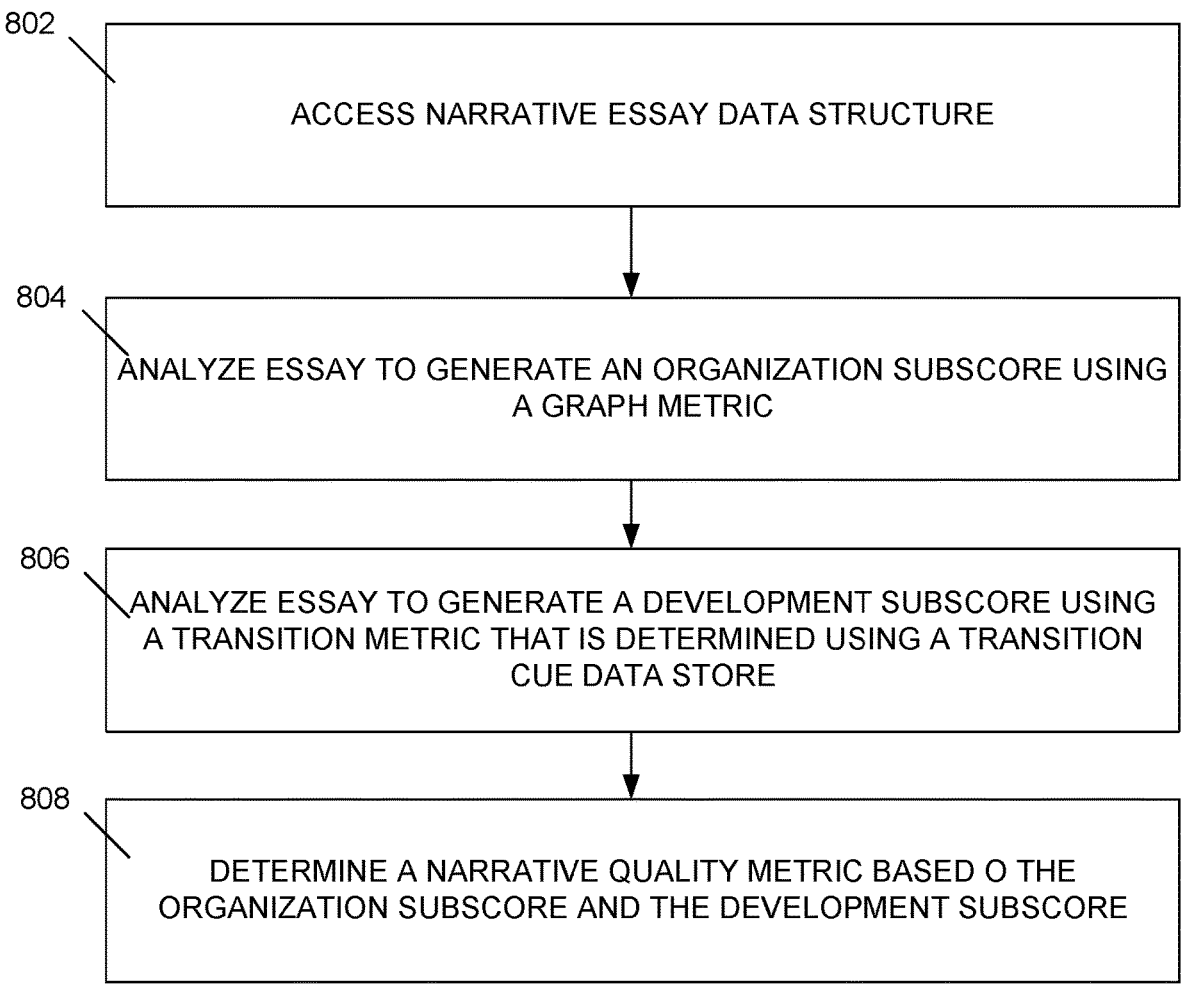
FIG. 8 is a flow diagram depicting a processor-implemented method for processing a response to essay prompts that request a narrative response.

FIG. 8 is a flow diagram depicting a processor-implemented method for processing a response to essay prompts that request a narrative response. A data structure associated with a narrative essay is accessed at 802. The essay is analyzed at 804 to generate an organization subscore, where the organization subscore is generated using a graph metric by identifying content words in each sentence of the essay and populating a data structure with links between related content words in neighboring sentences, wherein the organization subscore is determined based on the links. The essay is analyzed at 806 to generate a development subscore, where the development subscore is generated using a transition metric by accessing a transition cue data store and identifying transition words in the essay, wherein the development subscore is based on a number of words in the essay that match words in the transition cue data store. A narrative quality metric is determined at 808 based on the organization subscore and the development subscore, where the narrative quality metric is stored in a computer readable medium and is outputted for display on a graphical user interface, transmitted across a computer network, or printed.

Figure 9A:
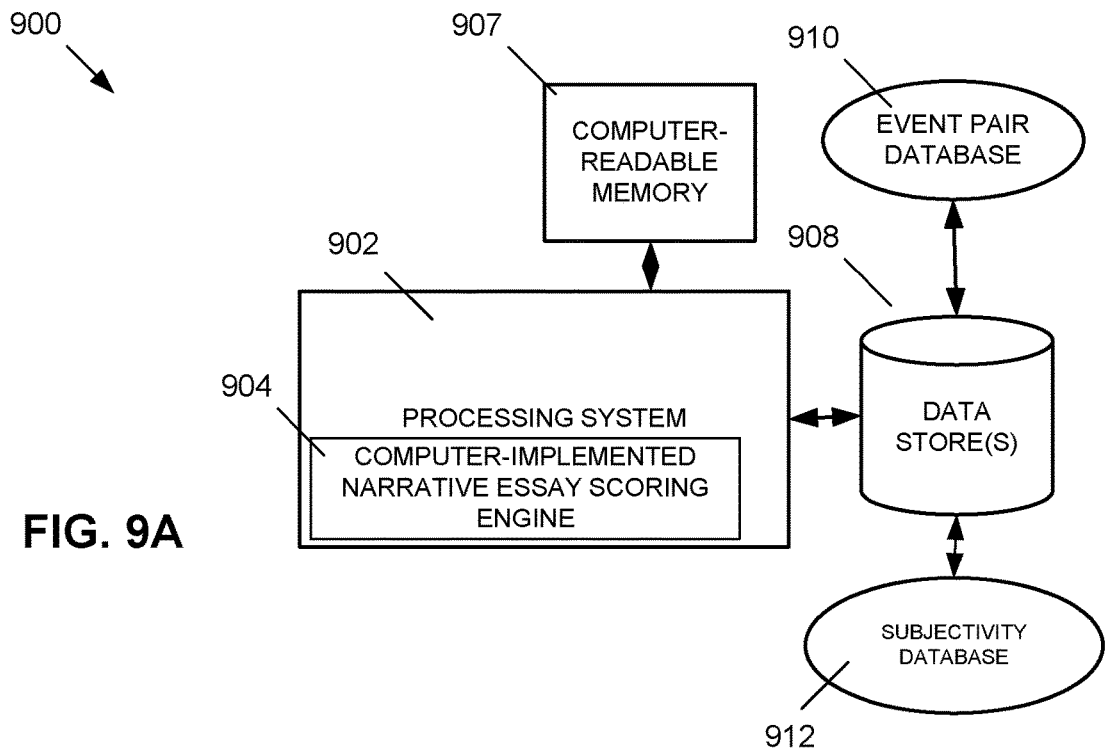
FIGS. 9A, 9B, and 9C depict example systems for implementing the approaches described herein for automatically scoring essay responses to a prompt that requests a narrative essay using a scoring model.
Figure 9B:
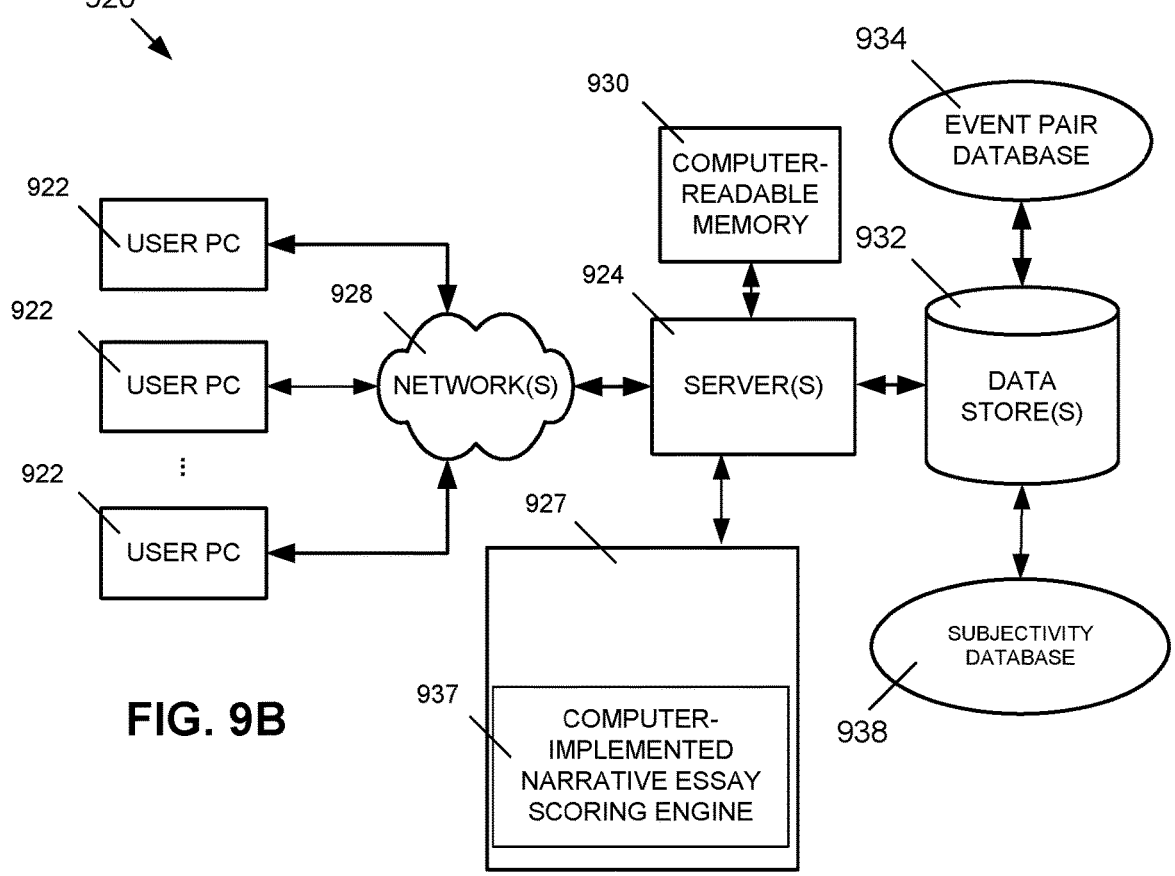
Figure 9C:
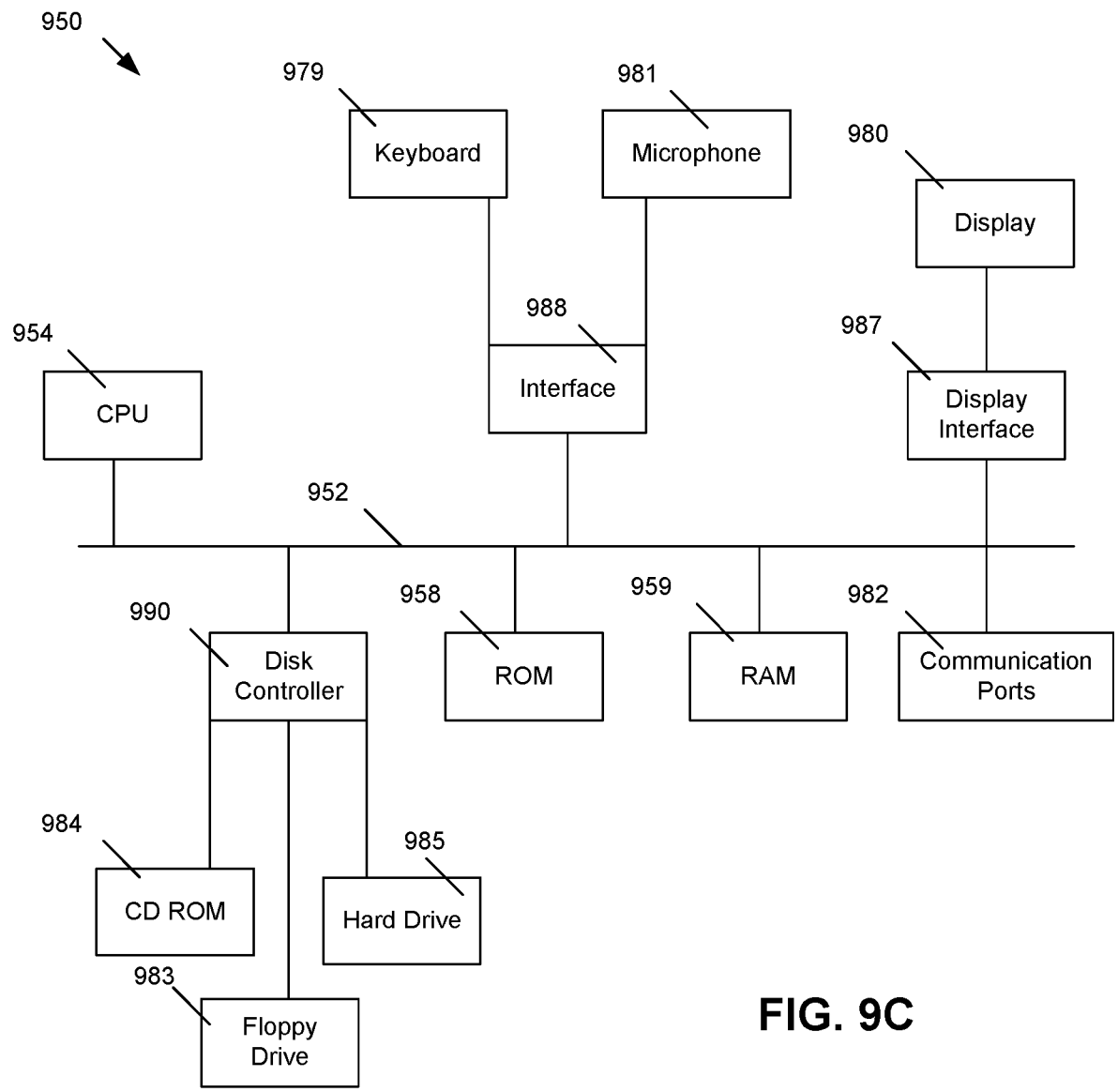

FIGS. 9A, 9B, and 9C depict example systems for implementing the approaches described herein for automatically scoring essay responses to a prompt that requests a narrative essay using a scoring model. For example, FIG. 9A depicts an exemplary system 900 that includes a standalone computer architecture where a processing system 902 (e.g., one or more computer processors located in a given computer or in multiple computers that may be separate and distinct from one another) includes a computer-implemented narrative essay scoring engine 904 being executed on the processing system 902. The processing system 902 has access to a computer-readable memory 907 in addition to one or more data stores 908. The one or more data stores 908 may include an event pair database 910 as well as a subjectivity database 912. The processing system 902 may be a distributed parallel computing environment, which may be used to handle very large-scale data sets.

FIG. 9B depicts a system 920 that includes a client-server architecture. One or more user PCs 922 access one or more servers 924 running a narrative essay scoring engine 937 on a processing system 927 via one or more networks 928. The one or more servers 924 may access a computer-readable memory 930 as well as one or more data stores 932. The one or more data stores 932 may include an event pair database 934 as well as a subjectivity database 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing the method of automatically scoring essay responses to a prompt that requests a narrative essay using a scoring model. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984, 988 may include one or more data structures for storing and associating various data used in the example systems for automatically scoring essay responses to a prompt using a scoring model. For example, a data structure stored in any of the aforementioned locations may be used to store data from XML files, initial parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from It is claimed:

1. A processor implemented method of processing a response to essay prompts that request a narrative response, comprising:
  accessing a data structure associated with a narrative essay;
  analyzing the essay to generate an organization subscore, wherein the organization subscore is generated using a graph metric by identifying content words in each sentence of the essay and populating a data structure with links between related content words in neighboring sentences;
  determining a content word metric by determining a proportion of words in the essay that are nouns, verbs, adjectives, and adverbs, wherein the organization subscore is determined based on the links and the content word metric;
  analyzing the essay to generate a development subscore, wherein the development subscore is generated using a transition metric by accessing a transition cue data store and identifying transition words in the essay; determining an event metric by accessing an event pair database that identifies pairs of words and an association value for each pair of words, extracting pairs of words from the essay; determining a stative metric by accessing a stative verb database, wherein the stative verb database contains verbs that describe states rather than events, wherein the development subscore is based on a number of words in the essay that match words in the transition due data storeand the content word metric, the event metric and the stative metric; and
  determining a narrative quality metric based on the organization subscore and the development subscore, wherein the narrative quality metric is stored in a computer readable medium and is outputted for display on a graphical user interface, transmitted across a computer network, or printed.

2. The method of claim 1, further comprising:
  analyzing the essay to generate a language proficiency subscore, wherein the language proficiency subscore is generated using a detail metric by determining a proportion of words in the essay that are proper nouns, adjectives, or adverbs.

3. The method of claim 2, further comprising:
  determining an essay quality score based on the organization subscore, the development subscore and the language proficiency subscore.

4. The method of claim 1, further comprising determining an event metric by accessing an event pair database that identifies pairs of words and an association value for each pair of words, extracting pairs of words from the essay and determining whether each extracted pair of words is in the event pair database, wherein the event metric is based on a proportion of extracted pairs that are located in the event pair database.

5. The method of claim 4, wherein the event metric is further based on a proportion of extracted pairs found in the event database that have an association value higher than a threshold value.

6. The method of claim 1, further comprising determining a subjectivity metric by accessing a subjectivity database that indicates whether words in the subjectivity database are positive words, negative words, or neutral words, wherein the subjectivity metric is based on a proportion of words in the essay that are found in the subjectivity database that are indicated as being either positive or negative words.

7. The method of claim 1, further comprising determining a pronoun metric by determining a proportion of words in the essay that are first or third person singular pronouns.

8. The method of claim 1, further comprising determining a modal metric by determining a proportion of words in the essay that are modal words.

9. The method of claim 1, further comprising determining a stative metric by accessing a stative verb database, wherein the stative verb database contains verbs that describe states rather than events, wherein the stative verb database does not include the verb "to be," wherein the stative metric is determined by determining a proportion of words in the essay that are matched in the stative verb database.

10. The method of claim 1, wherein the organization subscore is further determined based on a detail metric, a modal metric, a pronoun metric, a subjectivity metric, the transition metric.

11. The method of claim 1, wherein the development subscore is further determined based on the graph metric, a detail metric, a stative metric, and a modal metric.

12. The method of claim 2, wherein the language proficiency subscore is further determined based on the graph metric.

13. A processor implemented system for processing a response to essay prompts that request a narrative response, comprising:
  one or more data processors;
  a computer-readable medium encoded with instructions for commanding the one or more data processors to execute steps of a process, the steps including:
  accessing a data structure associated with a narrative essay;
  analyzing the essay to generate an organization subscore, wherein the organization subscore is generated using a graph metric by identifying content words in each sentence of the essay and populating a data structure with links between related content words in neighboring sentences;
  determining a content word metric by determining a proportion of words in the essay that are nouns, verbs, adjectives, and adverbs, wherein the organization subscore is determined based on the links and the content word metric;
  analyzing the essay to generate a development subscore, wherein the development subscore is generated using a transition metric by accessing a transition cue data store and identifying transition words in the essay; determining an event metric by accessing an event pair database that identifies pairs of words and an association value for each pair of words, extracting pairs of words from the essay; determining a stative metric by accessing a stative verb database, wherein the stative verb database contains verbs that describe states rather than events, wherein the development subscore is based on a number of words in the essay that match words in the transition due data store and the content word metric, the event metric and the stative metric; and
  determining a narrative quality metric based on the organization subscore and the development subscore, wherein the narrative quality metric is stored in a computer readable medium and is outputted for display on a graphical user interface, transmitted across a computer network, or printed.

14. The system of claim 13, the steps further comprising:
analyzing the essay to generate a language proficiency subscore, wherein the language proficiency subscore is generated using a detail metric by determining a proportion of words in the essay that are proper nouns, adjectives, or adverbs.

15. The system of claim 14, the steps further comprising:
determining an essay quality score based on the organization subscore, the development subscore and the language proficiency subscore.

16. The system of claim 13, the steps further comprising determining an event metric by accessing an event pair database that identifies pairs of words and an association value for each pair of words, extracting pairs of words from the essay and determining whether each extracted pair of words is in the event pair database, wherein the event metric is based on a proportion of extracted pairs that are located in the event pair database.

17. The system of claim 16, wherein the event metric is further based on a proportion of extracted pairs found in the event database that have an association value higher than a threshold value.

18. The system of claim 13, the steps further comprising determining a subjectivity metric by accessing a subjectivity database that indicates whether words in the subjectivity database are positive words, negative words, or neutral words, wherein the subjectivity metric is based on a proportion of words in the essay that are found in the subjectivity database that are indicated as being either positive or negative words.

19. A non-transitory computer-readable medium encoded with instructions for commanding one or more data processors to execute steps of a method of processing a response to essay prompts that request a narrative response, the steps comprising:
accessing a data structure associated with a narrative essay;
analyzing the essay to generate an organization subscore, wherein the organization subscore is generated using a graph metric by identifying content words in each sentence of the essay and populating a data structure with links between related content words in neighboring sentences;
determining a content word metric by determining a proportion of words in the essay that are nouns, verbs, adjectives, and adverbs, wherein the organization subscore is determined based on the links and the content word metric;
analyzing the essay to generate a development subscore, wherein the development subscore is generated using a transition metric by accessing a transition cue data store and identifying transition words in the essay;
determining an event metric by accessing an event pair database that identifies pairs of words and an association value for each pair of words, extracting pairs of words from the essay;
determining a stative metric by accessing a stative verb database, wherein the stative verb database contains verbs that describe states rather than events, wherein the development subscore is based on a number of words in the essay that match words in the transition due data store, the content word metric, the event metric and the stative metric; and
determining a narrative quality metric based on the organization subscore and the development subscore, wherein the narrative quality metric is stored in a computer readable medium and is outputted for display on a graphical user interface, transmitted across a computer network, or printed.

20. The non-transitory computer-readable medium of claim 19, the steps further comprising:
determining whether each extracted pair of words is in the event pair database, wherein the event metric is based on a proportion of extracted pairs that are located in the event pair database, and wherein the event metric is further based on a proportion of extracted pairs found in the event database that have an association value higher than a threshold value.

* * * * *